(12) United States Patent
Guichard et al.

(10) Patent No.: US 8,948,001 B2
(45) Date of Patent: Feb. 3, 2015

(54) SERVICE PLANE TRIGGERED FAST REROUTE PROTECTION

(75) Inventors: James Guichard, New Boston, NH (US); David Ward, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 115 days.

(21) Appl. No.: 13/533,961

(22) Filed: Jun. 26, 2012

(65) Prior Publication Data

US 2013/0343174 A1  Dec. 26, 2013

(51) Int. Cl.
  *H04L 12/22* (2006.01)
  *H04L 12/24* (2006.01)
  *H04L 12/26* (2006.01)

(52) U.S. Cl.
  USPC .......................................... 370/218; 370/242

(58) Field of Classification Search
  USPC .................. 370/218, 252, 392; 726/22–26
  See application file for complete search history.

(56) References Cited

U.S. PATENT DOCUMENTS

| | | | | |
|---|---|---|---|---|
| 7,852,778 | B1 * | 12/2010 | Kompella | 370/248 |
| 7,948,986 | B1 * | 5/2011 | Ghosh et al. | 370/392 |
| 8,077,726 | B1 | 12/2011 | Kumar et al. | |
| 8,094,575 | B1 * | 1/2012 | Vadlakonda et al. | 370/252 |
| 8,139,479 | B1 * | 3/2012 | Raszuk | 370/228 |
| 8,248,958 | B1 * | 8/2012 | Tulasi et al. | 370/250 |
| 8,797,886 | B1 * | 8/2014 | Kompella | 370/248 |
| 2005/0213557 | A1 * | 9/2005 | Hwang et al. | 370/351 |
| 2008/0175172 | A1 | 7/2008 | Nishi | |
| 2009/0028056 | A1 | 1/2009 | Rahman et al. | |
| 2009/0141621 | A1 | 6/2009 | Fan et al. | |
| 2010/0281539 | A1 * | 11/2010 | Burns et al. | 726/23 |
| 2011/0055921 | A1 * | 3/2011 | Narayanaswamy et al. | 726/22 |
| 2012/0106359 | A1 * | 5/2012 | Raszuk | 370/244 |

OTHER PUBLICATIONS

Extended European Search Report mailed Apr. 15, 2013 in corresponding EP Application No. 12197648.4, 5 pgs.
Pan et al., "Fast Reroute Extensions to RSVP-TE for LSP Tunnels," RFC 4090, May 2005, 39 pp.
Katz et al., "Bidirectional Forwarding Detection (BFD)," RFC 5880, Jun. 2010, 50 pp.
Aggarwal et al., "Bidirectional Forwarding Detection (BFD) for MPLS Label Switched Paths (LSPs)," RFC 5884, Jun. 2010, 13 pp.

* cited by examiner

*Primary Examiner* — Edan Orgad
*Assistant Examiner* — Emmanuel Maglo
(74) *Attorney, Agent, or Firm* — Shumaker & Sieffert, P.A.

(57) ABSTRACT

Techniques are described for detecting failure or degradation of a service enabling technology function independent from an operational state of a service node hosting the service enabling technology function. For example, a service node may provide one or more service enabling technology functions, and service engineered paths may be traffic-engineered through a network to service node network devices that host a service enabling technology function. A monitor component at the service layer of the service node can detect failure or degradation of one or more service enabling technology functions provided by the service node. The monitor component reports detection of failure or degradation to a fault detection network protocol in a forwarding plane of the service node. The fault detection network protocol communicates with an ingress router of a service engineered path to trigger fast reroute by the ingress of traffic flows to bypass the affected service enabling technology function.

28 Claims, 3 Drawing Sheets

SERVICE PLANE TRIGGERED FAST REROUTE PROTECTION

TECHNICAL FIELD

The disclosure relates to packet-based computer networks and, more particularly, to forwarding packets within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System—Intermediate System (ISIS) protocol or the Open Shortest Path First (OSPF) protocol.

In some instances, a node or link along an LSP may no longer be available. For example, a link along the LSP, or a node may experience a failure event, such as when one or more components of a router fail or the router is brought down by a user, such as a network operator. When a link or router in the network fails, routers using traditional link state protocols, such as OSPF and/or IS-IS, may take a long time to adapt their forwarding tables in response to the topological change resulting from node and/or link failures in the network. The process of adapting the forwarding tables is known as convergence. This time delay occurs because each node must update its representation of the network topology and execute the shortest path algorithm to calculate the next-hop for each destination within the updated network topology. Until the next-hops are re-computed, traffic being sent toward the failed links may be dropped. Some deployments take as much as 500 milliseconds to several seconds for detection and recovery from failures in the network. These large convergence times may adversely affect the performance of applications such as Voice over Internet Protocol (VoIP) and multimedia applications, which often rely on RSVP-TE, and are extremely sensitive to traffic loss.

SUMMARY

In general, techniques are described detecting failure or degradation of a service enabling technology function independent from an operational state of a service node hosting the service enabling technology function. For example, a service node may provide one or more service enabling technology functions, such as applications, virtual appliance, virtual cache, firewall, security, and others. Service engineered paths may be traffic-engineered through a network to one or more service node network devices that host service enabling technology function.

A monitor component at the service layer of the service node can detect failure or degradation of one or more service enabling technology functions provided by the service node. The monitor component can report its detection of such a failure or degradation to a fault detection network protocol in a forwarding plane of the service node. The fault detection network protocol communicates with an router of a service engineered path to trigger Fast Reroute (FRR) of traffic flows to bypass the service node and thus the affected service enabling technology function.

A fault detection network protocol, such as Bidirectional Forwarding Detection (BFD), can be extended as described herein to receive, from the service layer monitor component, a notification of a change in a performance status of a service enabling technology function. The fault detection network protocol can in turn output a notification over a BFD session to the ingress router to inform the ingress router of the failure or degradation of the service function. For example, the fault detection network protocol can send a control message to the ingress router to notify the ingress router to reroute network traffic requiring the service enabling technology function to a second instance of the service enabling technology function provided at a second service node reachable by a backup service engineered path.

In response to the edge router learning of the change in status of the service enabling technology function, the edge router can trigger fast reroute of network traffic onto a backup service engineered path that bypasses the first service node and directs traffic to a different instance of the service enabling technology function that is hosted at a second service node. In this manner, when an instance of a service enabling technology function fails, even though the first service node may remain operable, fast reroute may be triggered to reroute traffic to a different instance of the service enabling technology function.

The techniques of this disclosure may provide one or more advantages. For example, the techniques may allow an operator to maintain service integrity and any associated service-level agreement (SLA) requirements for the service in the event of failures not detectable using other link or node protection functions. The techniques provide automatic fast reroute of traffic when a performance degradation of a service is detected, and, beyond initial configuration of thresholds on the service node, do not require any action from the operator to effect fast reroute of traffic by a router to a different service node when a failure or degradation of a service occurs on the service node. This service-based fast reroute capability can be provided in addition to, and may be used in conjunction with, other link, interface, and node fast reroute protection capabilities of the service node and ingress router.

In one aspect, a method includes by a service node, applying a service to network traffic received at a service plane of the service node via a primary service engineered path, wherein the service node operates as an egress device of the primary service engineered path, and detecting, at the service plane of the service node, that a performance level of the service differs from an expected performance level of the service by at least a threshold amount, wherein the performance level of the service is independent of an overall operational state of the service node. The method also includes outputting a notification to a fault detection network protocol in a forwarding plane of the service node when the detected difference in the performance level of the service differs from the expected performance level by at least the threshold amount, and, in response to receiving notification from the service layer, outputting, by the fault detection network protocol, a control message to a router on the primary service engineered path, wherein the control message notifies the router to reroute network traffic to a second instance of the service provided at a second service node reachable by a backup service engineered path.

In another aspect, a network device includes a forwarding plane that includes a packet forwarding component, a fault detection network protocol executing within the forwarding plane, and a service plane comprising one or more service cards. The service plane includes a software process that applies a service to network traffic received at the network device via a primary service engineered path, wherein the network device operates as an egress device of the primary service engineered path, and a monitor component that communicates with the software process to assess a performance level of the software process in applying the service to the network traffic, wherein the performance level of the service is independent of an overall operational state of the network device. The monitor component detects that the performance level of the service differs from an expected performance level of the service by at least a threshold amount, wherein the monitor component outputs a notification to the fault detection network protocol when the detected difference in the performance level differs from the expected performance level by at least the threshold amount. In response to receiving the notification from the monitor component, the fault detection network protocol outputs a control message to a router on the primary service engineered path, wherein the control message notifies the router to reroute network traffic to a second instance of the service provided at a second network device reachable by a backup service engineered path.

In another aspect, a system includes a service node, and a router along a primary service engineered path between the service node and the router. The service node includes a forwarding plane that includes a packet forwarding component, a fault detection network protocol executing within the forwarding plane, and a service plane comprising one or more service cards. The service plane includes a software process that applies a service to network traffic received at the network device via the primary service engineered path, wherein the network device operates as an egress device of the primary service engineered path, and a monitor component that communicates with the software process to assess a performance level of the software process in applying the service to the network traffic, wherein the performance level of the service is independent of an overall operational state of the network device. The monitor component detects that the performance level of the service differs from an expected performance level of the service by at least a threshold amount, and the monitor component outputs a notification to the fault detection network protocol when the detected difference in the performance level differs from the expected performance level by at least the threshold amount. In response to receiving the notification from the monitor component, the fault detection network protocol outputs a control message to the router on the primary service engineered path, wherein the control message notifies the router to reroute network traffic to a second instance of the service provided at a second network device reachable by a backup service engineered path. The router receives the control message, and, in response to receiving the control message, reroutes traffic requiring application of the service to the second instance of the service provided at the second network device reachable by the backup service engineered path.

In another aspect, a computer-readable storage medium includes instructions for causing a programmable processor to apply a service to network traffic received at a service plane of a service node via a primary service engineered path, wherein the service node operates as an egress device of the primary service engineered path, and detect, at the service plane of the service node, that a performance level of the service differs from an expected performance level of the service by at least a threshold amount, wherein the performance level of the service is independent of an overall operational state of the service node. The computer-readable storage medium further includes instructions to output a notification to a fault detection network protocol in a forwarding plane of the service node when the detected difference in the performance level of the service differs from the expected performance level by at least the threshold amount, and further includes instructions to, in response to receiving notification from the service layer, output, by the fault detection network protocol, a control message to a router on the primary service engineered path, wherein the control message notifies the router to reroute network traffic to a second instance of the service provided at a second service node reachable by a backup service engineered path.

The details of one or more examples are set forth in the accompanying drawings and the description below. Other features, objects, and advantages will be apparent from the description and drawings, and from the claims.

DETAILED DESCRIPTION

Figure 1:
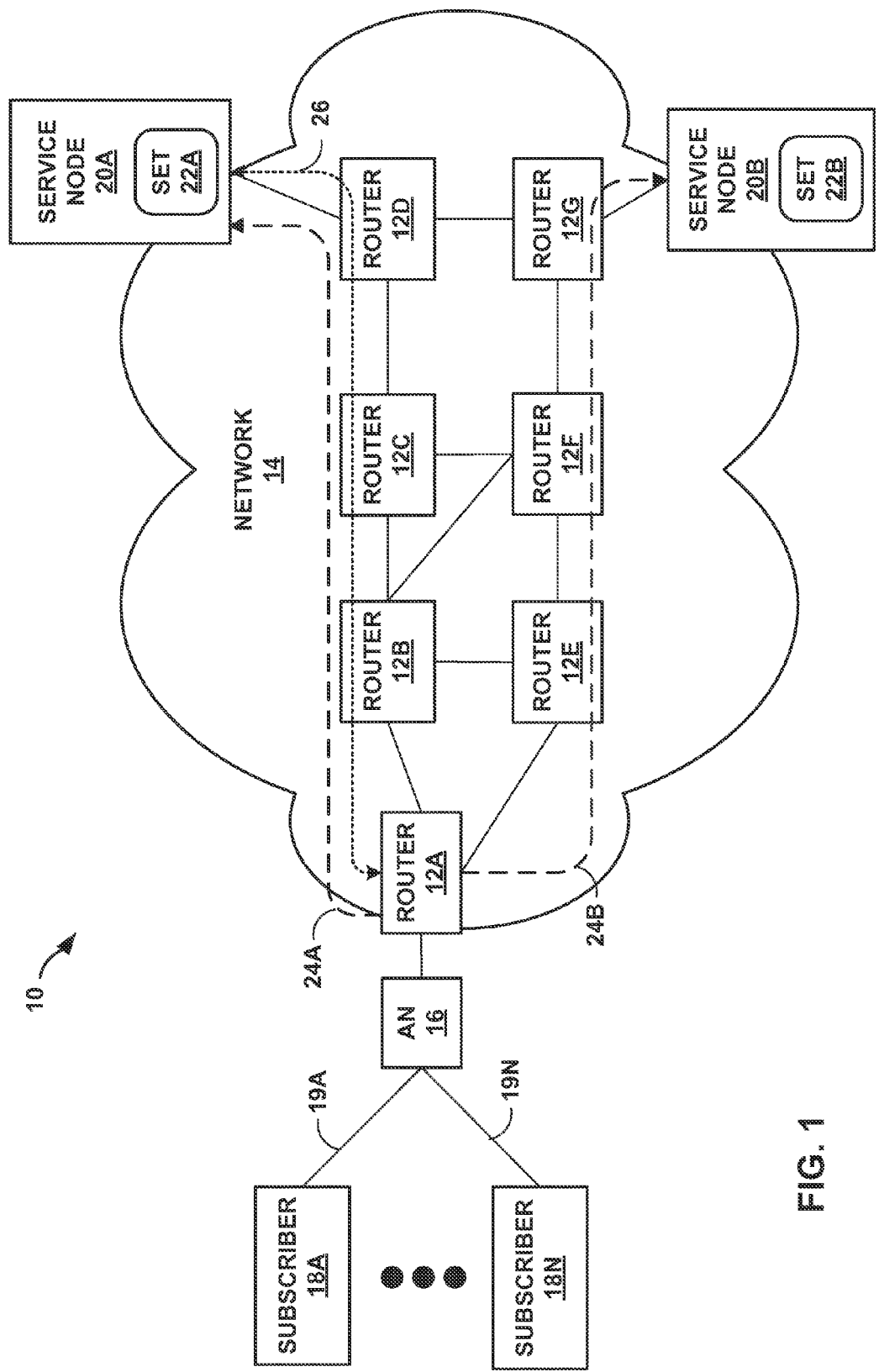
FIG. 1 is a block diagram illustrating an example system in which routers and service nodes are configured to operate in accordance with the techniques of this disclosure.

FIG. 1 is a block diagram illustrating an example system 10 in which routers 12A-12G ("routers 12") and service nodes 20A-20B ("service nodes 20") of network 14 are configured to operate in accordance with the techniques of this disclosure. In the illustrated example of FIG. 1, router 12A is an edge router of a network 14, which may be administered by a network service provider, and provides connectivity for subscribers 18A-18N ("subscribers 18"). Edge router 12A is coupled to access node (AN) 16 ("AN 16") via access links 19A-19N. Subscribers may be associated with customer networks or access networks (not shown). Edge router 12A communicates with access node 16 to provide subscribers 18 with access to network 14.

Each of subscribers 18 may include one or more computing devices (not shown), such as personal computers, laptop computers, handheld computers, workstations, servers, switches, printers, or other devices. Network 14 may be a service provider network coupled to one or more networks administered by other service providers, and may thus form part of a large-scale public network infrastructure, e.g., the Internet. The service provider may provide subscribers 18 with access to the Internet via network 14, which allows computing devices represented by subscribers 18 to communicate with computing devices within the Internet or with another one of subscribers 18. FIG. 1 may be a simplified view of network 14. Network 14 may include a variety of other network devices (not shown), such as routers, switches, servers, and the like and may be connected to other networks.

In this example, routers 12A-12G are connected to one another by physical links. The physical links 15 may be a physical medium, such as a copper wire, a coaxial cable, any of a host of different fiber optic lines, or a wireless connection. In order to maintain an accurate representation of the network 14, routers 12 and service nodes 20 exchange routing information using control-plane signaling in accordance with one or more defined protocols, such as the Border Gateway Protocol (BGP). Another example protocol for exchanging routing information is the Intermediate System to Intermediate System protocol (ISIS), which is an interior gateway routing protocol for IP networks for communicating link-state information within an autonomous system. Other examples of interior routing protocols include the Open Shortest Path First (OSPF), and the Routing Information Protocol (RIP).

The example of FIG. 1 illustrates a service enabling technology function ("SET 22A") hosted by service node 20A that is accessed by subscribers 18A-18N across service engineered path 24A that extends between edge router 12A and service node 20A. As used herein, a "service enabling technology (SET)" function is a service enabling technology that is physically deployed and hosted at a service node. Examples of service enabling technology functions may include applications, session border controller (SBC), virtual appliance, virtual cache, network traffic acceleration, network address translation (NAT), firewall, deep packet inspection (DPI), Quality of Service (QoS), access control, and other functions. In some examples, services provided by SETs may be composite services composed of two or more services, and may form a single externally visible service to subscribers 18. As one example, a SET may be a composite SET consisting of NAT services and firewall services.

As one example, edge router 12A receives a request for a particular service from a subscriber. For example, edge router 12A may receive a request from subscriber 18A for a parental control application service enabling technology function. Edge router 12A selects service node 20A as being able to provide the requested parental control application service enabling technology function. Service node 20A hosts an instance 22A of the parental control application service enabling technology function. In response to the request, edge router 12A establishes a service engineered path 24A to service node 20A, if service engineered path 24A is not already in place. Service engineered path 24A may be a traffic-engineered network tunnel, such as a label switched path (LSP) established using a resource reservation protocol, such as Resource Reservation Protocol with Traffic-Engineering Extensions (RSVP-TE), or other type of tunnel. In some examples, multiple SETs may be linked together using service engineered paths 24. As one example, router 12A may be establishing the service engineered paths 24 to carry layer two (L2) communications from subscribers 18 to service nodes 20 in the form of MPLS packets that enter the respective service engineered path 24 at ingress router 12A and exit the service engineered path 24 at service node 20A or 20B.

In addition, edge router 12A may also establish backup service engineered path 24B to a second service node 22B, which is a second service node that edge router 12A selects as also being able to provide the requested parental control application service enabling technology function. Service engineered path 24B is a second service engineered path, i.e., another traffic-engineered network tunnel. SET 22B may be a second instance of the same SET as SET 22A. Edge router 12A may use fast reroute extensions to RSVP-TE, such as described in P. Pan, "Fast Reroute Extensions to RSVP-TE for LSP Tunnels," RFC 4090, May 2005, the entire contents of which are incorporated by reference herein. For example, edge router 12A may serve as a point of local repair for fast reroute. Edge router 12A may install forwarding state that indicates that service engineered path 24A is a primary service engineered path for traffic from subscriber 18A, and service engineered path 24B is a backup service engineered path for traffic from subscriber 18A. Ingress router 12A associates the backup service engineered path 24B with the primary service engineered path 24A. Traffic normally forwarded through the primary service engineered path 24A is redirected onto service engineered path 24B should service engineered path 24A be marked as inoperable due to failure or degradation of SET 22A.

After router 12A finishes establishing backup service engineered path 24B, router 12A maintains forwarding information in a data plane of router 12A that allows router 12A to send traffic through service engineered path 24B upon receipt of a BFD control packet from service node 20A indicating failure or degradation of SET 22A. See, for example, techniques described by U.S. Pat. No. 8,077,726, entitled "Fast Reroute for Multiple Label Switched Paths Sharing a Single Interface," issued Dec. 13, 2011, the entire contents of which are incorporated by reference herein. In this manner, edge router 12A can automatically trigger fast reroute to send traffic from subscriber 18A to service node 20B via service engineered path 24B in the event that edge router 12A is notified of a problem with SET 22A or service node 20A, as described below.

Upon receiving network traffic from subscriber 18A, edge router 12A determines that a profile of subscriber 18A requires the traffic to be sent on service engineered path 24A to service node 20A for application of the parental control application 22A. Edge router 12A then forwards the traffic from subscriber 18A on service engineered path 24A, such as by appending an MPLS label to the traffic from subscriber 18A.

A monitor component in the service plane at service node 20A monitors performance levels of SET 22A. In the event that the monitor component detects a failure or degeneration of pre-set service levels for SET 22A, the monitor component triggers a failure event to BFD. The monitor component in the service plane may trigger an event to BFD in the forwarding plane when a degradation of performance of the service occurs such that the service enabling technology function can no longer provide the services paid for by a service level agreement (SLA). In some aspects, the monitor component may be a high availability (HA) monitor component that interacts with the service function. For example, the HA monitor may interact with services to collect statistics, perform handshaking, or carry out other checks to the functionality of services.

A BFD session 26 is enabled between router 12A and service node 20A, such as described in R. Aggarwal, "Bidirectional Forwarding Detection (BFD) for MPLS Label Switched Paths (LSPs)," RFC 5884, June 2010, the entire contents of which are incorporated by reference herein. To use BFD for fault detection on an MPLS LSP such as service engineered path 24A, edge router 12A and service node 20A establish a BFD session 26 for that particular MPLS LSP, e.g., using LSP Ping messages. BFD control packets are sent along the same data path as the service engineered path 24A being verified. BFD for MPLS LSPs typically used to detect a data plane failure in the MPLS LSP path, even when the control plane of devices associated with the MPLS LSP is functional. Here, BFD is being used to communicate, from a service node 20A to an ingress router 12A, that a performance degradation or failure has occurred with a service provided in a service plane of the service node 20A.

Service node 20A uses the BFD session 26 to report any change in status of SET 22A to edge router 12A. In some examples, a BFD module on service node 20A may set a diagnostic code of a BFD control packet to indicate the performance degradation in the relevant service. Ingress router 12A builds the backup service engineered path 24B using a diverse path that bypasses service node 20A, and directs traffic to a different instance of the SET that is hosted at another Service Node, e.g., SET 22B at service node 20B.

The performance level of the service enabling technology function is independent of an overall operational state of the service node network device. In other words, upon notification of this failure event through BFD session 26, edge router 12A is able to trigger fast reroute and switch traffic from service engineered path 24A to service engineered path 24B, even though the existing service node 20A used for SET 22A remains operable. The failover of network traffic requiring the service enabling technology function occurs without disruption to a subscriber receiving the services of the SET.

In some examples, service engineered path 24A may not be marked as wholly inoperable as a result of receiving the BFD control packet on BFD session 26, but may be marked as inoperable only with respect to the particular SET 22A that has failed. Service engineered path 24A may continue to be used by router 12A for forwarding traffic to service node 20A on service engineered path 24A for accessing other SETs hosted by service node 20A. In this manner, upon receiving a notification from service node 20A of a performance issue with SET 22A, edge router 12A can do a fast reroute operation to reroute only the traffic needing the failing service on to a backup service engineered path 24B, using fast reroute mechanisms typically used only in case of a link or node failure notification.

If the service that had been having performance issues (in this example SET 22A) later resumes its expected performance levels, the HA monitor in the service plane of service node 20A may detect this change, and notify the BFD protocol running on the forwarding plane of service node 20A, which in turn can inform the edge router 12A using BFD session 26. The edge router 12A can then determine whether to continue sending the relevant traffic on the service engineered path 24B or revert to sending the traffic on the service engineered path 24A.

Although FIG. 1 is described for purposes for illustration in part with respect to an edge router of network 14, the techniques may be also applied to a non-edge router. Likewise, the techniques of this disclosure may be applied by a router that is not the ingress of one or both of service engineered paths 24, but instead may be applied by a non-ingress router along the service engineered paths 24, such as a point of local repair router.

The configuration of the network environment illustrated in FIG. 1 is merely exemplary. For example, network 14 may include any number of edge routers coupled to one or more customer networks. Nonetheless, for ease of description, only edge router 12A and access node 16 are illustrated in FIG. 1. As another example, network 14 may include a greater number of service nodes 20 than shown, and each of service nodes 20 may provide a plurality of services and SETs.

Figure 2:
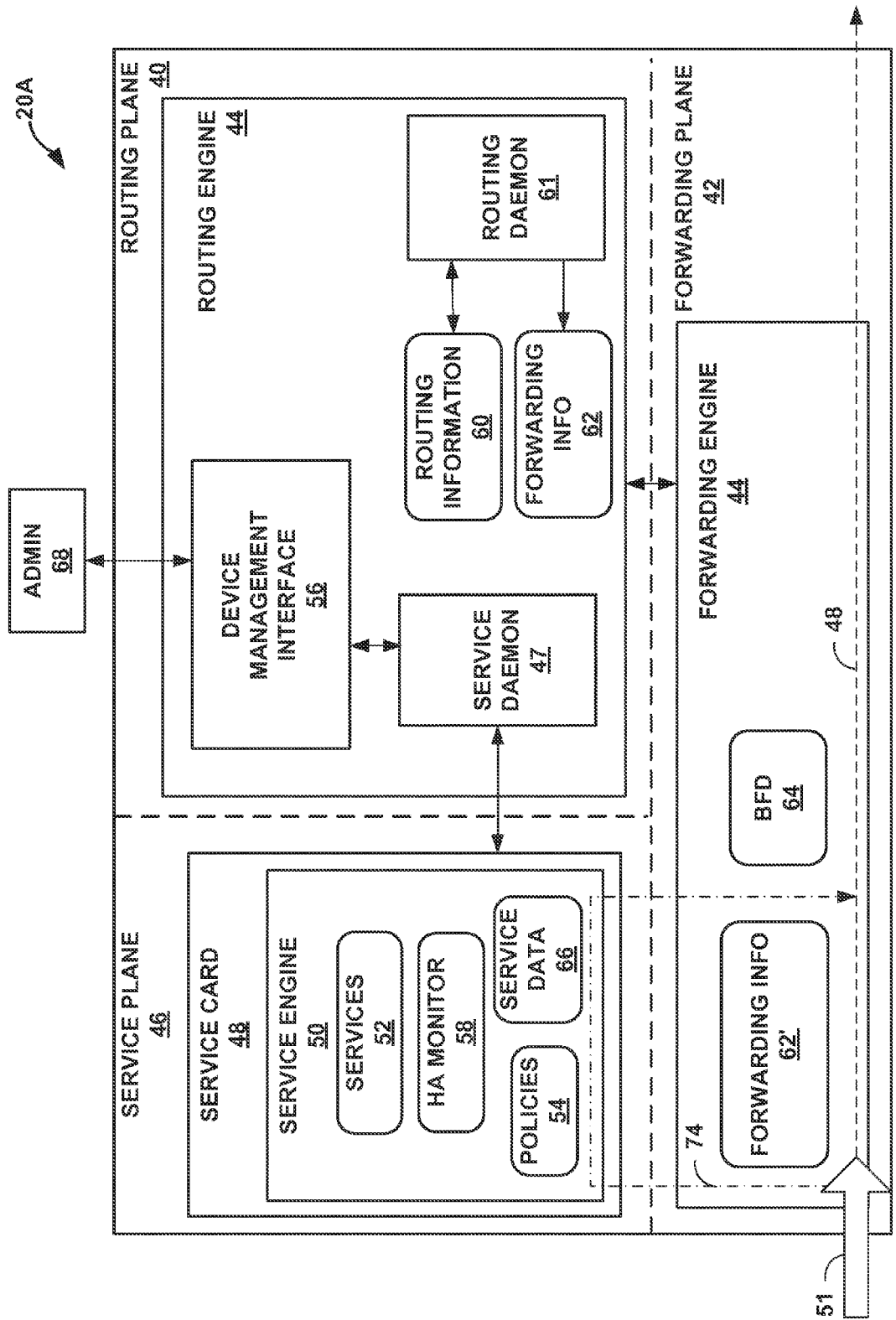
FIG. 2 is a block diagram illustrating an example embodiment of a service node network device in accordance with the techniques of this disclosure.

FIG. 2 is a block diagram illustrating an example of service node 20A in greater detail. Service node 20A may include a forwarding plane 42, a routing plane 40 and a service plane 46. Service node 20A may provide forwarding plane 42 for forwarding network traffic 51 and routing plane 40 for routing network traffic 51. In some instances, forwarding plane 42 may be distributed over a plurality of interfaces or interface cards (not shown), e.g., in a multi-chassis router. In other instances, forwarding plane 42 may be located in a central location, such as a programmable processor or other control unit of service node 20A. Typically, routing plane 40 resides in this central location, and in instances where forwarding plane 42 resides in the central location, the same programmable processor or other control unit may include or execute both forwarding plane 42 and routing plane 40. Routing plane 40 may, in some embodiments, be distributed over a plurality of processors or components.

Routing plane 40 may include a routing engine 44 that resolves routes through network 14 in accordance with one or more of a plurality of routing protocols. Routing engine 44 may include a device management interface 56 ("DMI 56") and a routing daemon 61. Routing engine 44 is primarily responsible for maintaining routing information 60 to reflect a current topology of network 14. Routing information 60 describes the topology of a network and, in particular, routes through the network. Routing information 60 may include, for example, route data that describes various routes within the network, and corresponding next hop data indicating appropriate neighboring devices within the network for each of the routes.

In addition, routing engine 44 uses routes stored in routing information 60 to compute best paths for particular network destinations and derive forwarding information 62 ("forwarding info 62"), which includes entries that map destination addresses to outbound interfaces on service node 20A. Routing engine 44 may push a subset of forwarding information 62 to forwarding engine 44 for storage as forwarding information 62'. Forwarding information 62 may, therefore, be thought of as a subset of the information contained within routing information 36. Forwarding information 62 may also include labels for use in forwarding MPLS packets along LSPs. Routing daemon 61 may represent a software module that updates routing information 50 to reflect a current topology of network 14. While described as a daemon or software module executed by routing engine 44, routing daemon 61 may be implemented as a hardware module or a combination of both hardware and software. Routing engine 44 also includes a service daemon that interfaces with service plane 46, such as to permit configuration of service card 48 by device management interface 56.

Forwarding plane 42 may include a forwarding engine 44. Forwarding engine 44 may represent a software and/or hardware component, such as one or more interface cards (not shown), that forwards network traffic 51. Forwarding engine 44 may divert aspects of network traffic 51 as service traffic 74 to service engine 50. After application of one or more services 52, service plane 46 returns the service traffic 74 to forwarding engine 44 to be merged into outbound network traffic 69. Forwarding engine 44 may forward some aspects of network traffic 51 as outbound network traffic 69 without diverting to the service plane 46, when application of services is not needed for the traffic.

Forwarding engine 44 may represent a central or distributed forwarding engine, where a distributed forwarding engine is distributed across a plurality of interface cards and a central forwarding engine resides in the above described central location, e.g., control unit 50, of service node 20A. Forwarding engine 44 may forward network traffic 51 in accordance with forwarding information 62' ("forwarding info 62"). Forwarding information 62' may comprise an association or table of mappings identifying an interface by which to forward a particular packet or data unit of network traffic 51.

Service node 20A may further provide service plane 46 for applying one or more of a plurality of services 52 to network traffic 51. Service plane 46 may implement the functionality of a network security device and/or other service oriented devices using at least one service card 48. As further examples, service plane 46 may implement service enabling technologies (SETs), including services and service oriented devices, represented by services 52. Example SETs that may be provided by services 52 include, for example, applications, session border controller (SBC), virtual appliance, virtual cache, network traffic acceleration, network address translation (NAT), firewall, deep packet inspection (DPI), Quality of Service (QoS), access control, or other service functions.

Service card 48 may include a service engine 50. Service engine 50 may represent a software and/or hardware component that applies services 52 in accordance with policy rules defined by policy configuration data stored by policies 54. Policies 54 may be a policy module that stores and maintains policy configuration data for service engine 50 and, by extension, service plane 46. In some examples, policies 54 may maintain policy configuration data in an XML-based encoding. However, in some embodiments, policies 54 may maintain policy configuration data in the form of one or more tables, linked lists, databases, flat files, or any other data structure.

Device management interface (DMI) 56 may represent a software and/or hardware module that presents an interface with which an administrator or an administrative device, represented by "ADMIN" 68, may interact to specify certain operational characteristics of service node 20A. In response to invocation by admin 68, device management interface 56 interacts with other components of service node 20A, such as to retrieve, configure, copy, and/or delete policy configuration data stored in policies 54, update service data 66 via service daemon 47, and to perform other management-related functions.

Service engine 50 applies one or more of services 52 to received packets in accordance with policies 54. As one example, for a service 52 comprising a parental control application, a packet may be received from a subscriber requesting access to web content associated with a given uniform resource locator (URL). The service 52 causes service engine 50 to reference policies 54 to determine whether a profile of a subscriber from which the packet is received allows the request from the subscriber to be allowed through to the specified URL. In another example, service engine 50 may apply a QoS policy that classifies packets meeting the policy condition to a particular forwarding equivalence class (FEC). In these instances, service engine 50 may forward packets differently depending on their classified FEC to meet QoS requirements.

Policy configuration data stored by policies 54 may include policies for any of services 52 applied by service plane 46. Although described herein with respect to policies 54 stored within service plane 46, in some embodiments, policies may be stored within or distributed to additional service cards 48, routing plane 40 or forwarding plane 42. For example, in some embodiments, forwarding plane 42 may store one or more policy rules for prompt application by the forwarding elements to network traffic 51.

Service engine 50 also includes a high availability monitor ("HA monitor") 58. HA monitor 58 may represent a software and/or hardware component that monitors performance of one or more of services 52 in service plane 46. Service plane 46 may provide an operating environment for running one or more applications, including one or more of services 52, created by a third-party software development kit (SDK). In some examples, HA monitor 58 may also be a software application that makes use of the SDK. In some aspects, services 52 may each expose an application programming interface (API) by which HA monitor inspects performance data (e.g., loading levels) for the respective service. Alternatively, HA monitor 58 may expose a universal interface, which each of services 52 may invoke to communicate current performance data. As another example, HA monitor 58 may periodically ping each service 52 or may monitor output communications from each of the services or operating-system level resources consumed by each of the services. HA monitor 58 can monitor any of a variety of parameters associated with services 52, which may be defined via a management plane of service node 20A, e.g., via device management interface 56. HA monitor 58 can monitor parameters associated with services 52 such as per-process central processing unit (CPU) usage, memory usage, rate of output, number of available connections, or any other parameters for detecting whether a service 52 is performing according to expected levels. For example, if a service 52 is expected to provide an output at a threshold rate, HA monitor 58 can detect when the actual rate of output falls below the threshold rate. An administrator can configure the performance level thresholds via device management interface 56, such as when an application or other service is initially deployed on service node 20A. The performance level thresholds may be stored as service data 66. The performance level thresholds may be selected relative to SLA requirements, to trigger action when performance levels fall below what required by subscribers 18.

As one example, a network address translation (NAT) function provided by one of services 52 may support a number of connections. Admin 68 may configure a threshold number of connections below which the NAT service should not fall for an expected performance level. Device management interface 56 configures service card 48 via service daemon 47 to store the configured threshold to service data 66. HA monitor 58 may continuously or periodically monitor the number of connections being supported by the NAT service, and if the number of connections available by the NAT service falls below the threshold number of connections, the HA monitor 58 can detect this event and send a notification to BFD module 64 in the forwarding plane.

When the performance level of a given one of services 52 is substantially different than expected, e.g., outside of one or more preset threshold ranges, HA monitor 58 in service plane 46 notifies a fault detection protocol of service node 20A, such as BFD module 64 of the forwarding plane 42 of service node 20A. For example, HA monitor 58 may notify BFD module 64 through an API or other internal software mechanism. HA monitor 58 can detect when one or more of services 52 is operating outside of expected performance level thresholds, and notifies BFD module 64 of the performance level issues of the service 52. In this manner, HA monitor 58 operates in the service plane 46 to monitor services 52, and provides a trigger to the fault detection protocol, e.g., BFD 64, in the forwarding plane 42 (sometimes referred to as the data plane), which, as described below, causes BFD 64 to send a control packet to ingress router 12A to trigger fast reroute by router 12A.

BFD module 64 may be extended as described herein to support the notification of failures or degradation of services 52, which may be service enabling technologies (SETs). Consistent with the principles of the disclosure, BFD module 64 provides signaling mechanisms for notifying an ingress edge router of a service engineered path of a failure of a service 52, such as an application or other service 52. In certain embodiments, the operations may be carried out automatically, i.e., without intervention by a system administrator or a software agent.

BFD module 64 can be implemented in the forwarding plane 42 and can continue to function through disruptions in the control plane of service node 20A. BFD module 64 uses control packets to indicate information about service node 20A to other devices, such as to edge router 12A over BFD session 26 (FIG. 1). For example, BFD module 64 can include diagnostic code in a control packet, where the diagnostic code value may be defined to indicate the local system's reason for a change in session state. The Diagnostic field may be used by the remote system (edge router 12A) to determine the reason that a session failed, for example. BFD module 64 sends BFD control packets in an encapsulation appropriate to the environment. For example, a BFD control packet may be encapsulated with an MPLS label and sent by source node 20A via an LSP of service engineered path 24A. Further details on BFD can be found in D. Katz, "Bidirectional Forwarding Detection (BFD)," RFC 5880, June 2010, the entire contents of which are incorporated by reference herein.

The Diagnostic field of the BFD control packet allows remote systems to understand the nature of a change in status of a session on the sender's system. In accordance with one example of the techniques of this disclosure, upon detecting a failure or degradation of one of services 52, BFD module 64 may send a BFD control packet that includes a newly defined diagnostic code in a Diagnostic (DIAG) field of the BFD control packet. As one example, BFD module 64 can be extended to include an additional new diagnostic code used to indicate a failure or degradation of an operational state of one or more of services 52, despite that the data plane (forwarding plane 42) and control plane of service node 20A are still working normally. The new diagnostic code may be referred to as a "Service Down" code, for example. Assuming edge router 12A executes a BFD module that can process the new diagnostic code, when the edge router 12A receives the BFD control message having the new diagnostic code set, its BFD module will be informed by the diagnostic code of the BFD control message that a failure or degradation of some service has occurred, and a forwarding plane of edge router 12A can take appropriate action to automatically trigger fast reroute of packets requiring services to a different service node.

As a further example, BFD module 64 of service node 20A may be extended to identify the particular service for which the performance degradation has been detected. For example, BFD module 64 can be extended to include both a "service down" diagnostic code as well as other sub-codes that can be used to specify which particular services 52 are experiencing performance problems. In this example, BFD may need further modifications so as to allocate enough bits in the BFD control packet to the sub-codes. Edge router 12A receiving the BFD control message having the new diagnostic code and sub-code set will be informed by the diagnostic code of the BFD control message that a failure or degradation of a particular identified service 52 has occurred, and in response edge router 12A can take appropriate action to trigger fast reroute of affected packets to a different instance of the service on a different service node. The BFD module on edge router 12A would likewise be modified in order to process the new diagnostic code and sub-codes to carry out the required actions and decide which traffic to reroute. In some aspects, edge router 12A can perform fast reroute for traffic needing the identified service, but can leave other traffic to service node 20A intact over service engineered path 24A. That is, edge router 12A may not reroute all traffic from service engineered path 24A, but may just update its forwarding state to forward all traffic requiring the identified service 52 onto service engineered path 24B. This may provide a selective fast reroute function allowing router 12A to reroute traffic for some services and not others.

In another alternative example, in response to notification by HA monitor 58 of a performance issue in a service 52, instead of using a new "Service Down" diagnostic code, BFD module 64 of service node 20A may use an existing code of BFD to indicate that service node 20A is down to trigger the fast reroute, e.g., a node failure event, even though the service node 20A is not actually down. In response to receiving the BFD control packet indicating a node failure, edge router 12A may reroute all traffic from service node 20A to one or more alternative service nodes, (e.g., service node 20B).

The architecture of service node 20A illustrated in FIG. 2 is shown for exemplary purposes only. The disclosure is not limited to this architecture. In other examples, service node 20A may be configured in a variety of ways. Although described for exemplary purposes in reference to BFD, the principles described herein may be applied to extend other protocols, such as other protocols for Operations, Administration, and Maintenance (OAM) and/or fault detection. In some examples, BFD module 64 may execute on one or more interface cards of forwarding plane 42 (not shown).

Aspects of service plane 46, routing plane 40, or forwarding plane 42 may be implemented solely in software, or hardware, or may be implemented as a combination of software, hardware, or firmware. For example, service plane 46, routing plane 40, or forwarding plane 42 may include one or more hardware-based processors which execute software instructions. In that case, the various software modules of service plane 46, routing plane 40, or forwarding plane 42, such as BFD module 64, may comprise executable instructions stored on a computer-readable storage medium, such as computer memory or hard disk.

Figure 3:
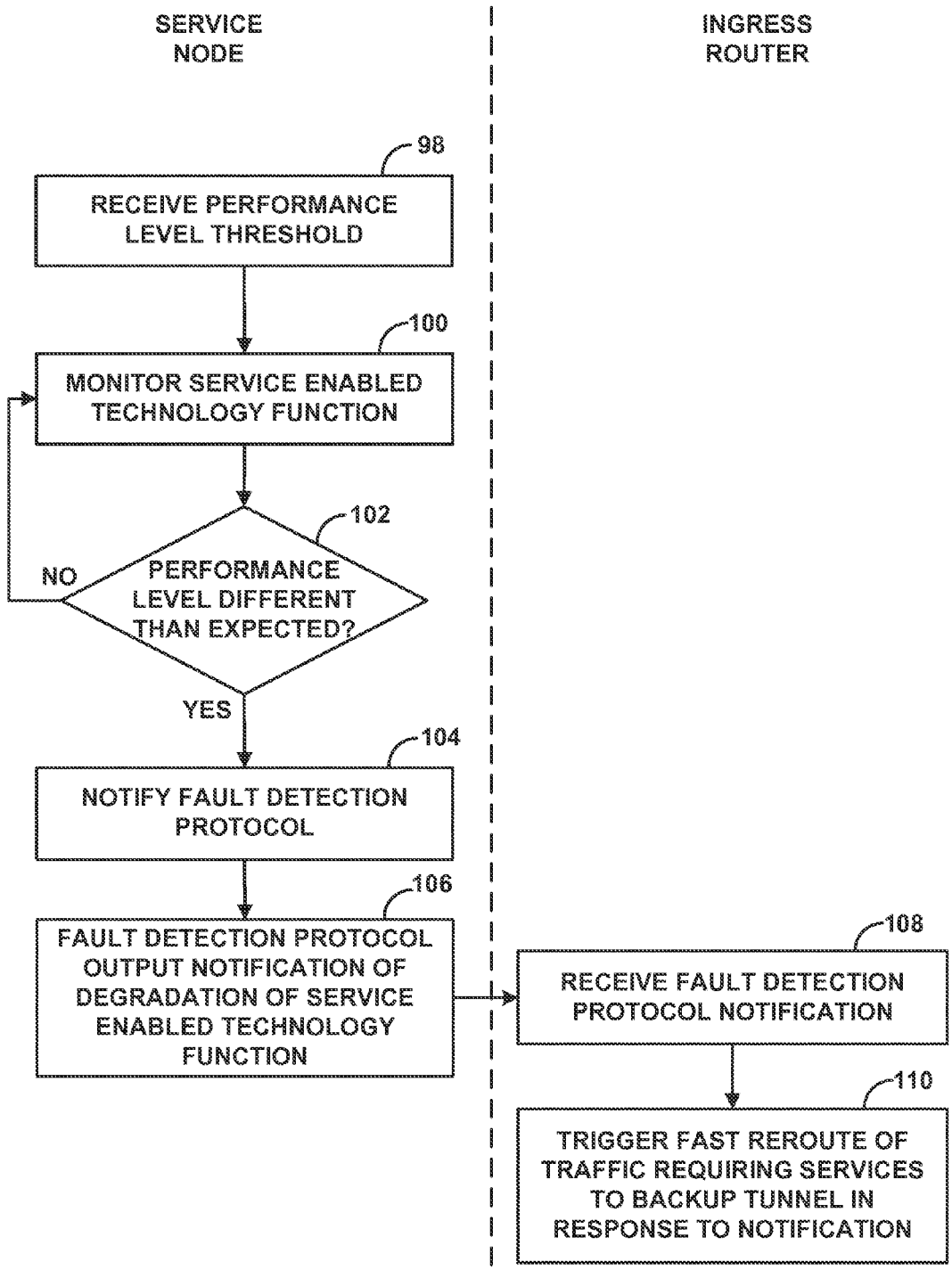
FIG. 3 is a flowchart illustrating example operation of network devices in accordance with the techniques of this disclosure.

FIG. 3 is a flowchart illustrating example operation of network devices in accordance with the techniques of this disclosure. For purposes of example, FIG. 3 will be described with reference to service node 20A of FIGS. 1 and 2, and router 12A of FIG. 1. Although FIG. 3 is described for purposes for illustration in part with respect to an edge router of network 14, the techniques may be also applied to a non-edge router. Likewise, the techniques of this disclosure may be applied by a router that is not the ingress of one or both of service engineered paths 24, but instead may be applied by another non-ingress router along the service engineered paths 24, such as a point of local repair router.

The service plane 46 may receive one or more performance level thresholds, such as by administrator configuration, and may store the thresholds as service data 66 (98). HA monitor 58 in the service plane 46 (also referred to as the "service layer") of service node 20A monitors aspects one or more of services 52 to ascertain whether a performance level of the service 52 is within an expected range of performance level, based on the performance level thresholds of service data 66 (100). When the performance level is not substantially different than expected, e.g., not outside of preset threshold range(s) (YES of block 102), HA monitor 58 continues to monitor the services 52. For example, HA monitor 58 may interact with services 52 to collect statistics, perform handshaking, or carry out other checks to the functionality of services 52.

When the performance level of a given one of services 52 is substantially different than expected, e.g., outside of one or more preset threshold ranges (NO of block 102), HA monitor 42 notifies a fault detection protocol of service node 20A, such as BFD module 64 of the forwarding plane 42 of service node 20A (104). The change in performance level may indicate that the service 52 has failed or degraded. The notification from HA monitor 42 to BFD module 64 may identify the service for which the performance degradation or failure has been detected. In response to receiving the notification from HA monitor 58 of the service plane 46, BFD module 64 outputs a control packet on an existing BFD session 26 to ingress router 12A, to notify router 12A of the degradation of performance of the service 52 (106). As described above, the control packet can include various forms of information to trigger router 12A to reroute of some or all traffic from service node 20A. For example, the BFD control packet may include a diagnostic code that specifies that network traffic being sent to service node 20A for service 52 should be sent elsewhere.

Router 12A executes a corresponding BFD module that receives the BFD control packet (108). In response to receiving the BFD control packet, edge router 12A determines which traffic should be rerouted, selects a new service node such as service node 20B having another instance of the required service 52, and triggers fast reroute of the traffic requiring services to the service node 20B (110). In some examples, edge router 12A may automatically update stored forwarding information to modify next hops for routes formerly destined for service node 20A via service engineered path 24A, to now reflect a next hop to reach service node 20B via service engineered path 24B. If service engineered path 24B is not already in existence, edge router 12A may establish service engineered path 24B at this time, e.g., using RSVP-TE.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
by a service node, applying a service to network traffic received at a service plane of the service node via a primary service engineered path, wherein the service node operates as an egress device of the primary service engineered path;
detecting, at the service plane of the service node, that a performance level of the service differs from an expected performance level of the service by at least a threshold amount, wherein the performance level of the service is independent of an overall operational state of the service node;
outputting a notification from the service plane to a fault detection network protocol in a forwarding plane of the service node in response to determining that the detected performance level of the service differs from the expected performance level by at least the threshold amount; and
in response to receiving notification from the service plane, outputting, by the fault detection network protocol, a control message to a router on the primary service engineered path, wherein the control message notifies the router to reroute network traffic to a second instance of the service provided at a second service node reachable by a backup service engineered path.

2. The method of claim 1, wherein the service comprises a network service comprising at least one of an application, session border controller (SBC), virtual appliance, virtual cache, network traffic acceleration, network address translation (NAT), firewall, deep packet inspection (DPI), Quality of Service (QoS), and access control.

3. The method of claim 1, further comprising monitoring, at the service plane of the service node, performance of the service.

4. The method of claim 1, wherein monitoring performance of the service comprises executing a high availability (HA) monitor software component at the service plane, wherein the HA monitor software component interacts with the service to assess the performance of the service.

5. The method of claim 4, wherein the HA monitor software component exposes an interface that can be invoked by the service to communicate performance data to the HA monitor software component.

6. The method of claim 4, wherein the HA monitor software component is operable on a service card of the service node.

7. The method of claim 1, wherein the primary service engineered path comprises a traffic-engineered path established using a resource reservation protocol with traffic engineering extensions (RSVP-TE) LSP.

8. The method of claim 1, wherein detecting that the performance level of the service differs from the expected performance level by the threshold amount comprises detecting that the service has failed.

9. The method of claim 1, wherein the expected performance level is determined based on a service level agreement (SLA).

10. The method of claim 1, wherein the overall operational state of the service node is operational when the performance level of the service differs from the expected performance level by the threshold amount.

11. The method of claim 1, wherein the fault detection network protocol comprises a Bidirectional Forwarding Detection (BFD) protocol executing within the forwarding plane of the service node,
wherein outputting a control message comprises outputting a BFD control packet on a BFD session established between the service node and the router, wherein the BFD session is associated with the primary service engineered path, and
wherein the BFD control packet specifies a diagnostic code that indicates that the router should reroute network traffic to a different service node.

12. The method of claim 11, wherein the diagnostic code of the BFD control packet specifies the particular service for which network traffic should be rerouted to the second service node providing the second instance of the service.

13. The method of claim 1, further comprising:
receiving the control message by the router; and
in response to receiving the control message, rerouting traffic requiring application of the service to a backup service engineered path to a different instance of the service.

14. The method of claim 1, wherein the router on the primary service engineered path comprises an ingress router of the primary service engineered path, and wherein the primary service engineered path comprises a traffic-engineered path between the ingress router and the service node in which the service node is selected as being capable of providing the service to traffic associated with the primary service engineered path.

15. The method of claim 1, wherein the service comprises a first service, further comprising:
by the service node, applying a second service to network traffic received at a service plane of the service node via a primary service engineered path, wherein the service node operates as an egress device of the primary service engineered path;
monitoring, at the service plane of the service node, a first performance level of the first service relative to a first threshold performance level;
monitoring, at the service plane of the service node, a second performance level of the second service relative to a second threshold performance level.

16. The method of claim 1, wherein the service comprises a composite service comprising two or more service functions.

17. A network device comprising:
a forwarding plane comprising:
a packet forwarding component;
a fault detection network protocol executing within the forwarding plane; and
a service plane comprising one or more service cards, wherein the service plane comprises:
a software process that applies a service to network traffic received at the network device via a primary service engineered path, wherein the network device operates as an egress device of the primary service engineered path, and
a monitor component that communicates with the software process to assess a performance level of the software process in applying the service to the network traffic, wherein the performance level of the service is independent of an overall operational state of the network device;
wherein the monitor component detects that the performance level of the service differs from an expected performance level of the service by at least a threshold amount,
wherein the monitor component outputs a notification to the fault detection network protocol in response to determining that the detected performance level differs from the expected performance level by at least the threshold amount, and
wherein, in response to receiving the notification from the monitor component, the fault detection network protocol outputs a control message to a router on the primary service engineered path, wherein the control message notifies the router to reroute network traffic to a second instance of the service provided at a second network device reachable by a backup service engineered path.

18. The network device of claim 17, wherein the service comprises a network service comprising at least one of an application, session border controller (SBC), virtual appliance, virtual cache, network traffic acceleration, network address translation (NAT), firewall, deep packet inspection (DPI), Quality of Service (QoS), and access control.

19. The network device of claim 17, wherein the monitor component of the service plane monitors performance of the service.

20. The network device of claim 17, wherein the monitor component comprises a high availability (HA) monitor software component at the service plane, operable on a service card of the service node, wherein the HA monitor software component interacts with software process that applies the service to assess the performance of the software process in applying the service.

21. The network device of claim 20, wherein the HA monitor software component exposes an interface that can be invoked by software process that applies the service to communicate performance data to the HA monitor software component.

22. The network device of claim 17, wherein the fault detection network protocol comprises a Bidirectional Forwarding Detection (BFD) protocol module executing within the forwarding plane of the service node, wherein the BFD module outputs a BFD control packet on a BFD session established between the service node and the router, wherein the BFD session is associated with the primary service engineered path, wherein the BFD control packet specifies a diagnostic code that indicates that the router should reroute network traffic to a different service node.

23. The network device of claim 17, wherein the diagnostic code of the BFD control packet specifies the particular service for which network traffic should be rerouted to the second service node providing the second instance of the service.

24. The network device of claim 17, wherein the software process comprises a first software process that applies a first service, wherein the service plane comprises a second software process that applies a second service to network traffic received at the network device via the primary service engineered path, wherein the monitor component monitors a first performance level of the first software process relative to a first threshold performance level, and wherein the monitor component monitors a second performance level of the second service relative to a second threshold performance level.

25. A system comprising:
a service node; and
a router along a primary service engineered path between the service node and the router;
wherein the service node comprises:
a forwarding plane comprising:
a packet forwarding component;
a fault detection network protocol executing within the forwarding plane; and
a service plane comprising one or more service cards, wherein the service plane comprises:
a software process that applies a service to network traffic received at the router via the primary service engineered path, wherein the router operates as an egress device of the primary service engineered path, and
a monitor component that communicates with the software process to assess a performance level of the software process in applying the service to the network traffic, wherein the performance level of the service is independent of an overall operational state of the router;
wherein the monitor component detects that the performance level of the service differs from an expected performance level of the service by at least a threshold amount,
wherein the monitor component outputs a notification to the fault detection network protocol in response to determining that the detected performance level differs from the expected performance level by at least the threshold amount, and
wherein, in response to receiving the notification from the monitor component, the fault detection network protocol outputs a control message to the router on the primary service engineered path, wherein the control message notifies the router to reroute network traffic to a second instance of the service provided at a second network device reachable by a backup service engineered path;
wherein the router receives the control message, and, in response to receiving the control message, reroutes traffic requiring application of the service to the second instance of the service provided at the second network device reachable by the backup service engineered path.

26. A non-transitory computer-readable storage medium comprising instructions for causing a programmable processor to:
apply a service to network traffic received at a service plane of a service node via a primary service engineered path, wherein the service node operates as an egress device of the primary service engineered path;
detect, at the service plane of the service node, that a performance level of the service differs from an expected performance level of the service by at least a threshold amount, wherein the performance level of the service is independent of an overall operational state of the service node;
output a notification to a fault detection network protocol in a forwarding plane of the service node in response to determining that the detected performance level of the service differs from the expected performance level by at least the threshold amount; and
in response to receiving notification from the service plane, output, by the fault detection network protocol, a control message to a router on the primary service engineered path, wherein the control message notifies the router to reroute network traffic to a second instance of the service provided at a second service node reachable by a backup service engineered path.

27. The method of claim 1,
wherein the fault detection network protocol periodically outputs messages to the router indicating that the forwarding plane of the service node is operational, and
wherein outputting, by the fault detection network protocol, a control message to a router on the primary service engineered path comprises one of the messages, wherein the control message notifies the router to reroute network traffic to a second instance of the service provided at a second service node reachable by a backup service engineered path.

28. The method of claim 1, wherein the fault detection network protocol periodically receives messages from the router indicating that the forwarding plane of the router is operational.

* * * * *